Feb. 5, 1963    M. R. NEGRETE    3,076,933
CIRCUIT FOR MEASURING THE DIFFERENCE IN THE INTEGRATED
AMPLITUDE OF TWO SETS OF PULSES
Filed May 31, 1960

INVENTOR
MARCO R. NEGRETE

BY J. C. Cloynard
ATTORNEY 3,076,933
CIRCUIT FOR MEASURING THE DIFFERENCE IN THE INTEGRATED AMPLITUDE OF TWO SETS OF PULSES
Marco R. Negrete, Santa Clara, Calif., assignor to Hewlett-Packard Company, Palo Alto, Calif., a corporation of California
Filed May 31, 1960, Ser. No. 32,692
5 Claims. (Cl. 324—140)

This invention relates to a circuit for measuring accurately the difference in the integrated amplitude of two sets of recurring pulses. A circuit of this type is useful, for instance, in noise figure meters where one set of pulses represents the sum of the output of a local noise source and of the receiver noise, and the other set of pulses represents only the receiver noise. The difference in the integrated amplitude of these two sets of pulses is used to measure the noise figure.

When the difference between the integrated amplitude of the two sets of pulses is small, it is necessary to make the integrating circuit time constant fairly large. This gives maximum sensitivity, but makes the measuring device slow to respond to a change in the condition to be measured. On the other hand, when the difference between the integrated amplitude of the two sets of pulses is farly large, it is desirable to reduce the integrating circuit time constant in order to increase the speed of response of the measuring device.

It is an object of this invention to permit the adjustment of the integrating circuit time constant in a device for measuring the difference between the integrated amplitude of two sets of recurring pulses without affecting the zero adjustment or the sensitivity of the measuring circuit.

It is another object of this invention to provide a circuit of the above type in which transistors are used to gate the two sets of pulses, and in which variations in the leakage saturation current ($I_{co}$) of the transistors due to temperature changes does not affect the accuracy of the measurement.

Figure 1:
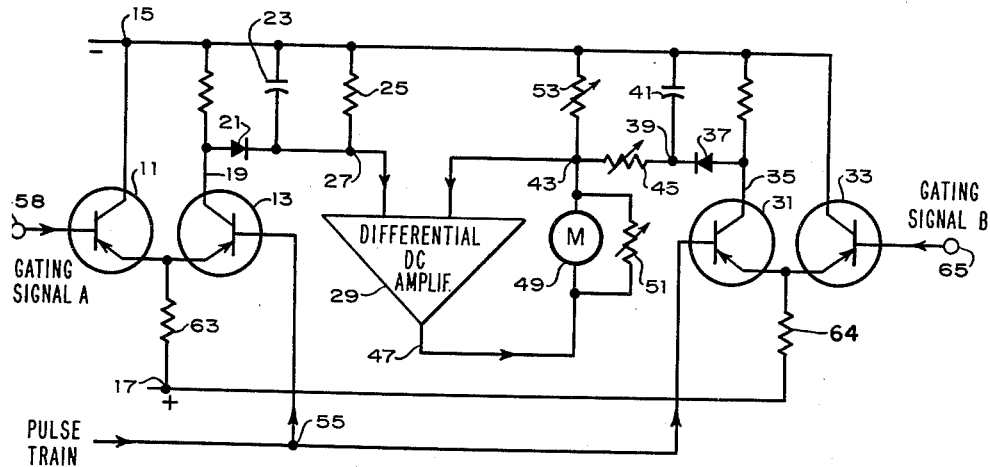
Figure 2:
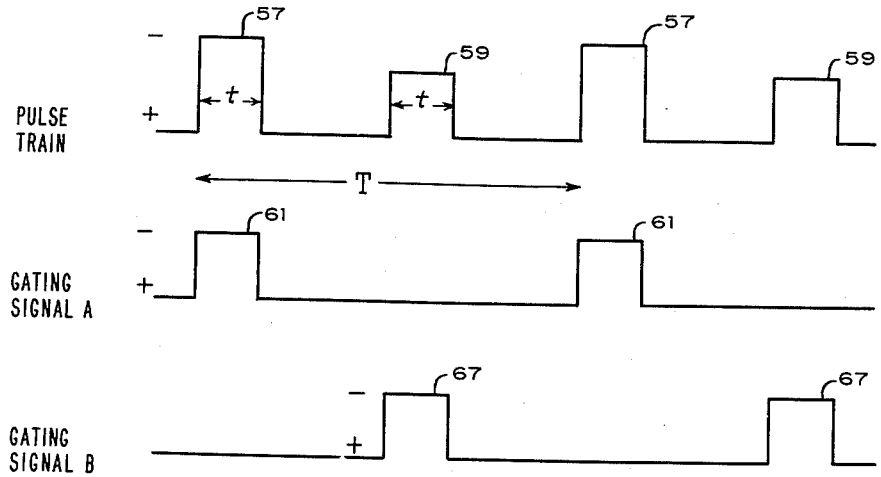

Other and incidental objects of this invention will be apparent from a reading of this specification and an inspection of the accompanying drawing in which:

FIGURE 1 shows a schematic diagram of a circuit in accordance with this invention; and FIGURE 2 shows pulses applied to the circuit of FIGURE 1.

Referring now to the drawing, we have a first gate comprising two transistors 11 and 13 connected between a negative power supply terminal 15 and a positive power supply terminal 17. The output of this gate is taken at the collector 19 of transistor 13, and connected through a unilateral conduction device such as diode 21 to one terminal of storage capacitor 23, the other terminal of which is connected to terminal 15. Storage capacitor 23 has a resistor 25 connected in parallel with it. Capacitor 23 is connected to the input terminal 27 of differential amplifier 29.

We have also another gate comprising two transistors 31 and 33 also connected between the power supply terminals 15 and 17. The output from this gate is taken from the collector 35 of transistor 31 and applied through a unilateral conduction device such as diode 37 to the terminal 39 of capacitor 41, the other terminal of which is connected to power supply terminal 15. Terminal 39 is connected to the other input terminal 43 of the differential amplifier 29 through a variable resistor 45. This resistor 45 is used to vary the time constant of the integrating circuit comprising resistor 45 and capacitor 41. The output terminal 47 of the differential amplifier 29 is connected through a meter 49 to the input terminal 43 of the differential amplifier 29. The meter 49 is shunted by variable resistance 51 which is used to vary the meter sensitivity. The input terminal 43 of differential amplifier 29 is connected to terminal 15 through a variable resistor 53. This resistor 53 is used for zero adjustment of the meter. In the absence of any incoming signal to the common terminal 55, the meter 49 should give a zero reading. Any unbalance between both of the input circuits to the differential amplifier 29 is compensated by adjusting the setting of resistor 53. Resistor 53 may also be used to give a predetermined offset if such is desired.

The bases of transistors 13 and 31 are tied to a common point 55 to which there is applied a pulse train in which pulses 57 (belonging to one set) alternate with pulses 59 (belonging to the other set). A gating signal A is applied to the base 58 of transistor 11. This gating signal comprises pulses 61 which coincide in time with pulses 57 of the pulse train. These pulses 61 causes the transistor 13 to conduct, so that the average direct current flowing in the collector 19 is equal to $$\frac{V_A\ t}{R_A\ T}$$

where $V_A$ is the voltage of pulse 57, $R_A$ is the resistance of resistor 63, $t$ is the duration of pulse 57 and $T$ is the period of pulses 57. Similarly, a gating signal B is applied to the base 65 of transistor 33. This gating signal comprises pulses 67 which coincide in time with pulses 59 of the pulse train. These pulses 67 cause the transistor 31 to conduct, so that the average direct current flowing in the collector 35 is equal to $$\frac{V_B\ t}{R_B\ T}$$

where $V_B$ is the voltage of pulse 59, $R_B$ is the resistance of resistor 64, $t$ is the duration of pulses 59 and $T$ is the period of pulses 59.

The diodes 21 and 37 prevent the flow of the collector cut-off current $I_{co}$ through resistors 25 and 53 during the time the gates are closed. This makes the inputs to the differential amplifier 29 substantially independent of $I_{co}$, thus giving the instrument a high degree of temperature stability since $I_{co}$ varies substantially with temperature.

The currents flowing into the collectors 19 and 35 build up charges on the capacitors 23 and 41 which are proportional to the voltages of the pulses 57 and 59 integrated over a period depending on the time constants of the integrating circuits comprising capacitors 23 and 41. Since these capacitors are connected to the inputs 27 and 43 of the differential amplifier 29, we may consider the signal at input terminal 27 as a reference voltage. The signal at input terminal 43 is then a constant D.-C. voltage with A.-C. fluctuations which are inversely proportional to the time constant $R_{45}C_{41}$.

The differential amplifier 29 has its output fed back from output terminal 47 to input terminal 43 through the meter 49. The amplifier 29 thus acts to keep the voltages at terminals 27 and 43 equal by adding or subtracting current from terminal 43. This current is measured by the meter 49 which thus indicates the difference between these two voltages, and therefore the difference between the integrated amplitude of the two sets of pulses 57 and 59. The effect of the feedback to terminal 43 is to lower the impedance at that point, so that the time constant of the integrating circuit for the pulses 59 is determined by $R_{45}C_{41}$ only. Thus the time constant, the meter sensitivity adjustment and the null adjustment may be varied independently and without affecting the others. Thus, if the difference between the integrated amplitudes of the two sets of pulses increases in relation to noise, $R_{45}$ may be reduced thereby giving greater measurement speed with no change in accuracy.

I claim:
1. A circuit for measuring the difference between the integrated amplitude of two sets of pulses, said circuit comprising first and second integrating circuits, means to apply pulses of one set to said first integrating circuit, means to apply pulses of the other set to said second integrating circuit, a differential amplifier having first and second inputs and an output, means to connect the first and second integrating circuits respectively to the first and second inputs of said differential amplifier, means to vary the time constant of said second integrating circuit, a meter, means including said meter and connecting the output of said amplifier to the second input thereof, a source of unidirectional signal, and an impedance to apply said unidirectional signal to the second input of said differential amplifier.

2. A circuit for measuring the difference between the integrated amplitude of two sets of pulses, said circuit comprising first and second integrating circuits, means to apply pulses of one set to said first integrating circuit, means to apply pulses of the other set to said second integrating circuit, a differential amplifier having first and second inputs and an output, means to connect the first and second integrating circuits respectively to the first and second inputs of said differential amplifier, means to vary the time constant of said second integrating circuit, a meter connected between the output of said amplifier and the second input thereof, a resistor connected in shunt with said meter, a source of unidirectional signal, and an impedance to apply said unidirectional signal to the second input of said differential amplifier.

3. A circuit for measuring the difference between the integrated amplitude of two sets of pulses, said circuit comprising first and second integrating circuits, means including a first unilateral conduction device to apply pulses of one set to said first integrating circuit, means including a second unilateral conduction device to apply pulses of the other set to said second integrating circuit, a differential amplifier having first and second inputs and an output, means to connect the first and second integrating circuits respectively to the first and second inputs of said differential amplifier, means to vary the time constant of said second integrating circuit, a meter, means including said meter and connecting the output of said amplifier to the second input thereof, a source of unidirectional signal, and an impedance to apply said unidirectional signal to the second input of said differential amplifier.

4. A circuit for measuring the difference between the integrated amplitude of two sets of pulses, said circuit comprising first and second integrating circuits, each integrating circuit comprising a capacitor, means including a first unilateral conduction device to apply pulses of one set to said first integrating circuit, means including a second unilateral conduction device to apply pulses of the other set to said second integrating circuit, a differential amplifier having first and second inputs and an output, means to connect the first and second integrating circuits respectively to the first and second inputs of said differential amplifier, means to vary the time constant of said second integrating circuit, a meter connected between the output of said amplifier and the second input thereof, a first resistor in shunt with said meter, a source of D.C. voltage, and a second resistor connecting said source of D.C. voltage and the second input of said differential amplifier.

5. A circuit for measuring the difference between the integrated amplitude of two sets of recurring pulses, said circuit comprising a first gate, means to apply pulses of one set to said first gate, means to render said first gate conductive during the occurrence of the pulses of said first set, a second gate, means to apply pulses of the other set to said second gate, means to render said second gate conductive during the occurrence of the pulses of said second set, a differential amplifier having two inputs and an output, a first integrating circuit connected between said first gate and one input of said differential amplifier, a second integrating circuit connected between said second gate and the other input of said differential amplifier, means to vary the time constant of said second integrating circuit, a meter, means including said meter and connecting the output of said amplifier to the second input thereof, a source of unidirectional signal, and an impedance to apply said unidirectional signal to the second input of said differential amplifier.

References Cited in the file of this patent
UNITED STATES PATENTS

| | | |
|---|---|---|
| 2,418,284 | Winchel | Apr. 1, 1947 |
| 2,485,665 | Shepherd | Oct. 25, 1949 |
| 2,487,603 | Scoles | Nov. 8, 1949 |
| 2,779,872 | Patterson | Jan. 29, 1957 |